US009300815B2

(12) United States Patent
Cooper et al.

(10) Patent No.: US 9,300,815 B2
(45) Date of Patent: Mar. 29, 2016

(54) POWER BACKUP SYSTEM

(75) Inventors: Ian Robert Cooper, Ipswich (GB);
Leslie Derek Humphrey, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1440 days.

(21) Appl. No.: 12/992,847

(22) PCT Filed: Apr. 21, 2009

(86) PCT No.: PCT/GB2009/001008
§ 371 (c)(1),
(2), (4) Date: Nov. 15, 2010

(87) PCT Pub. No.: WO2009/138711
PCT Pub. Date: Nov. 19, 2009

(65) Prior Publication Data
US 2011/0064212 A1   Mar. 17, 2011

(30) Foreign Application Priority Data
May 15, 2008   (EP) ..................................... 08251710

(51) Int. Cl.
*H04M 3/00* (2006.01)
*H04M 19/08* (2006.01)

(52) U.S. Cl.
CPC ..................................... *H04M 19/08* (2013.01)

(58) Field of Classification Search
CPC ....................................................... H04M 3/00
USPC ........................................................ 379/307
See application file for complete search history.

(56) References Cited

U.S. PATENT DOCUMENTS

| 6,393,105 | B1 * | 5/2002 | Beveridge ..................... 379/56.2 |
| 2003/0093701 | A1 * | 5/2003 | Freyman et al. ............... 713/300 |
| 2007/0127712 | A1 * | 6/2007 | Hinman et al. ........... 379/413.02 |
| 2008/0028237 | A1 * | 1/2008 | Knight .......................... 713/300 |
| 2008/0159744 | A1 * | 7/2008 | Soto et al. ...................... 398/115 |
| 2009/0092242 | A1 * | 4/2009 | Cooke et al. .................. 379/324 |
| 2010/0144326 | A1 * | 6/2010 | Wilhelmsson ............. 455/414.1 |

FOREIGN PATENT DOCUMENTS

| WO | WO 94/15424 | 7/1994 |
| WO | WO 99/34541 | 7/1999 |

(Continued)

*Primary Examiner* — Rexford Barnie
*Assistant Examiner* — Daniel Kessie
(74) *Attorney, Agent, or Firm* — Patterson Thuente Pedersen, P.A.

(57) ABSTRACT

An electrically powered node of a telecommunications system has a battery power backup associated with its power control unit. Under normal conditions it is maintained fully charged by means of trickle currents from the mains power feeds to each of a number of mains—connected customer equipments, by way of the "final drop" to the distribution point. These trickle currents are controlled by the respective power control units, to prevent overcharging. Using an electrical copper connection provided in parallel with the fibre connection, a battery backup can also be maintained in nodes further towards the exchange. The feeds are reversible, so that if a power outage removes the power supply from the customer premises, a "lifeline" plain telephone service between the exchange and the telephone handset is maintained using the local battery backup in the remote nodes. By limiting the service to simple telephony, the battery power can be sufficient to maintain the service for a reasonable duration. The power management systems can be used to transfer charge from one battery to another over the network according to the usage, or remaining life, of each battery.

11 Claims, 3 Drawing Sheets

(56) References Cited

FOREIGN PATENT DOCUMENTS

| WO | WO 00/33488 | 6/2000 |
| WO | WO 01/22716 A1 | 3/2001 |
| WO | WO 2007/056197 A2 | 5/2007 |
| WO | WO 2009/138710 | 11/2009 |

* cited by examiner

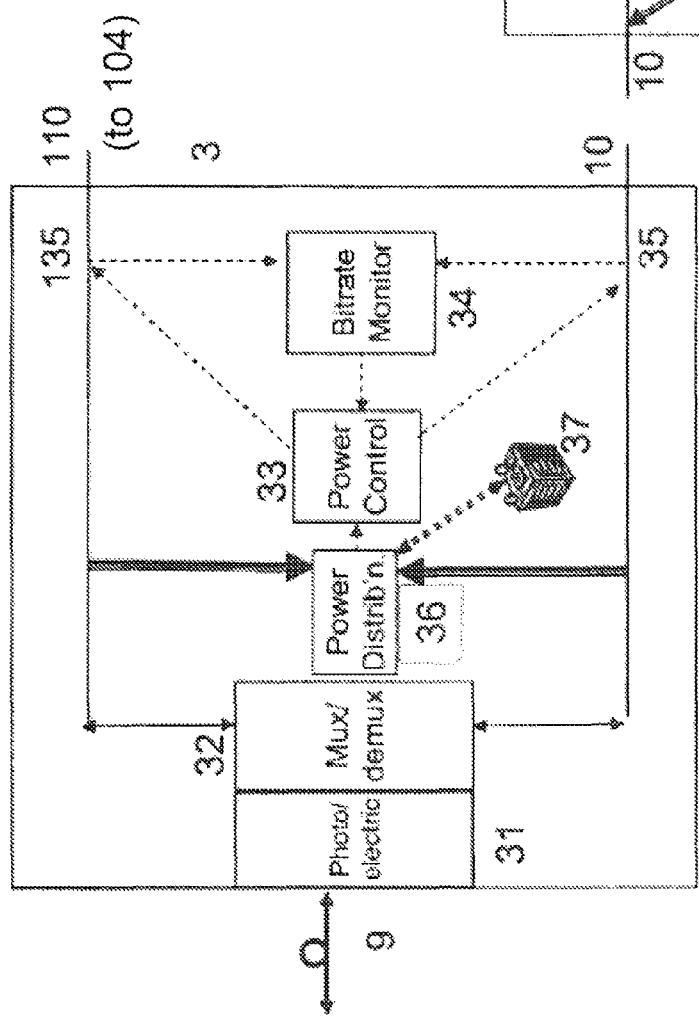
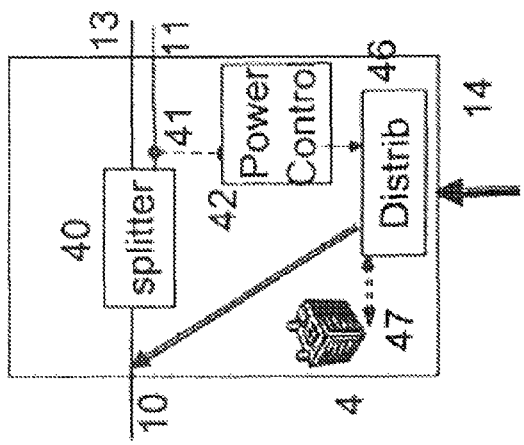
Figure 3
Figure 4

POWER BACKUP SYSTEM

PRIORITY CLAIM

The present application is a National Phase entry of PCT Application No. PCT/GB2009/001008, filed Apr. 21, 2009, which claims priority from European Application Number 08251710.3, filed May 15, 2008, the disclosures of which are hereby incorporated by reference herein in their entirety.

TECHNICAL FIELD

This invention relates to the provision of electrical power to elements of a telecommunications network.

BACKGROUND ART

In conventional telephone networks (known colloquially as "POTS"—plain old telephone system) the end-to-end connection between a telephone exchange and customer premises is made by a branched network of wires along which an electric current can be transmitted, the current being modulated to provide analogue voice signals, and also digital pulses as used for dialling numbers, activating bells or other alerts ("ringing current") and, more recently, for data transmission such as facsimile transmissions or computer connections to the "Internet". The existence of an end-to-end electrical connection in conventional systems allows simple customer equipment (specifically telephone handsets) to be powered at low voltage from a power supply at the exchange. This was a particular advantage in the early development of telecommunications networks, when mains power supplies were less widespread than they have since become. It remains a useful feature that the telephone equipment is powered independently of the mains power supply to the customer premises, as in the event of failure of that supply, a user can still use the telephone to report the fact to the power supply company. Indeed, the user instructions for cordless telephones (which require a mains supply for the base station) strongly advise users to also maintain a fixed (wired-in) telephone on the premises for use in such eventualities.

The presence of an end-to-end wired network has also allowed intermediate elements (herein referred to as "nodes") in the branched network to use electrical power delivered over the wires from elsewhere in the network. Many of these points are either in public locations (the familiar roadside "cabinets", and the "distribution points" which are typically positioned at the top of wooden poles from where the "final drop" wire is connected to the customer premises). These nodes are unattended and often either in remote locations, where it may be difficult to arrange a mains power supply, or in public locations where the presence of a mains power supply could constitute a hazard to some members of the public, and a temptation to others. Hitherto, such nodes have had relatively modest power requirements, and provision of a low-voltage power supply from the exchange has been sufficient to avoid the need for a mains power supply to be provided to these nodes.

For the avoidance of doubt, the term "node" in this specification refers to elements within the network, as distinct from the "network termination point" (also known as the "network interface device" NID) located on a customer's premises which provides the interface between the network operator's equipment and that of the customer.

Modern developments in telephony have made this simple pattern less practical in recent times. In particular, the use of electromagnetic media (e.g. microwave or, more commonly, optical fiber) is already well-established in the trunk network (between exchanges) and is now becoming established in the local distribution network. Such arrangements are sometimes known as "fiber to the curb", only the "final drop" from distribution point to customer premises remaining as conventional copper wire. The use of such connections allows much greater capacity. It is also cheaper as copper is relatively expensive compared with optical fiber (or indeed microwaves). However, electrical power cannot be provided to the network nodes over such media.

A typical arrangement is shown in FIG. 1. The exchange or central office 1 is connected by way of one or more intermediate nodes, known as cabinets 2 and distribution points 3, to the customer premises network termination equipment (NTE) 4. As shown in FIG. 1, the NTEs are connected to the distribution point 3, but longer connections where the termination is a long distance from any other termination may be connected directly to a cabinet 4 without an intermediate DP 3. Connected to the NTE 4 by internal connections 11, 13 are one or more standard telephones 5 and a "hub" (home gateway) 6 serving a home network 12 (wired or wireless) to which is connected one or more computer terminals 7, 8.

As shown in FIG. 1, the "final drop" 10 between the distribution point 3 and the customer premises NTE 4 is made by copper connection, but the connections 9 between the central office 1 and the cabinet 2, and between the cabinet 2 and the distribution point 3, are made by fiber optic connection.

Such arrangements break the hitherto continuous copper connection between the local exchange (central office 1) and the customer premises (NTE 4), and more specifically between the local exchange (central office 1) and the intermediate nodes (cabinet 2, distribution point 3). At the same time, the intermediate nodes 2, 3 now have greater power requirements than hitherto, in particular because transmission over the optical or microwave links itself requires power to generate the optical or microwave carrier.

However, most modern customer premises telecommunications equipment, such as computers, require much more power than can be supplied over the low-voltage telecommunications network 9, 10 and therefore have their own mains supply. It has been proposed for electrical power to be fed into the telecommunications network by way of the customer premises NTE 4 from a power feed 14, and through the "final drop" connection 10, (which remains wired) to the distribution point 3, as shown in FIG. 1. (To encourage the use of suitable customer premises equipment, the use of such equipment might be expected to attract a discount from the telecommunications provider). As each distribution point feeds a number of customer premises, the power required of each customer would be relatively small.

A problem with such an arrangement is that the network provider is reliant on the customers' own electrical power supplies to power the service. In the absence of a power supply from the exchange 1, even the standard plain old telephone services, or "POTS" have to be powered by the mains power supply 14 of the customer premises NTE 4. In the event of failure of that supply, the customer would be deprived of telephone service. This is considered unacceptable, as it would prevent vulnerable users making calls in an emergency—in particular, calls to report the power failure itself.

SUMMARY OF THE INVENTION

According to an embodiment of the invention, a node in a telecommunications network comprises a power management system arranged to allow the node to receive electrical power from one or more customer network terminations connected thereto by electrical communications media, and also to deliver electrical power to one or more customer network terminations. This allows a service to be maintained to any such terminations not currently receiving power. To conserve power and to avoid the potential for abuse of this arrangement, only limited service may be made available when the customer is drawing, rather than supplying, power. This can be achieved by providing the node with a communications connection control system for delivering a first category of telecommunications service when power is being supplied to the node from one or more network terminations, and delivering a second, more limited category of communications service when power is not being supplied to the node, or to any network terminations that are not currently supplying power to the node.

However, a general power failure in the district could result in none of the customers being able to supply power to the network. To overcome this problem, a battery backup is preferably provided in the network node, and is kept charged by a trickle charge from each participating user termination. This will allow a basic telephone service to be provided even during a widespread power outage. The parameters of this basic service may be set by the power management system of the node according to the remaining capacity of the battery, for example telephony-only, calls to/from specified numbers only, calls to the emergency services only (i.e 112, 911, 999, according to country).

Provision may be made for the batteries of one or more network nodes to be supplied with power backup from one or more others which are connected to the mains, either directly or through further network connections, provided that there is a wired ("copper") connection between them.

BRIEF DESCRIPTION OF THE DRAWINGS

An embodiment of the invention will now be described, by way of example, with reference to the Figures, in which:

FIG. 3 is a functional block diagram of a network node according to an embodiment the invention; and FIG. 4 is a functional block diagram of a network termination with a power feed, complementary to the network node of FIG. 3, and also according to an embodiment of the invention.

DETAILED DESCRIPTION

Figure 1:
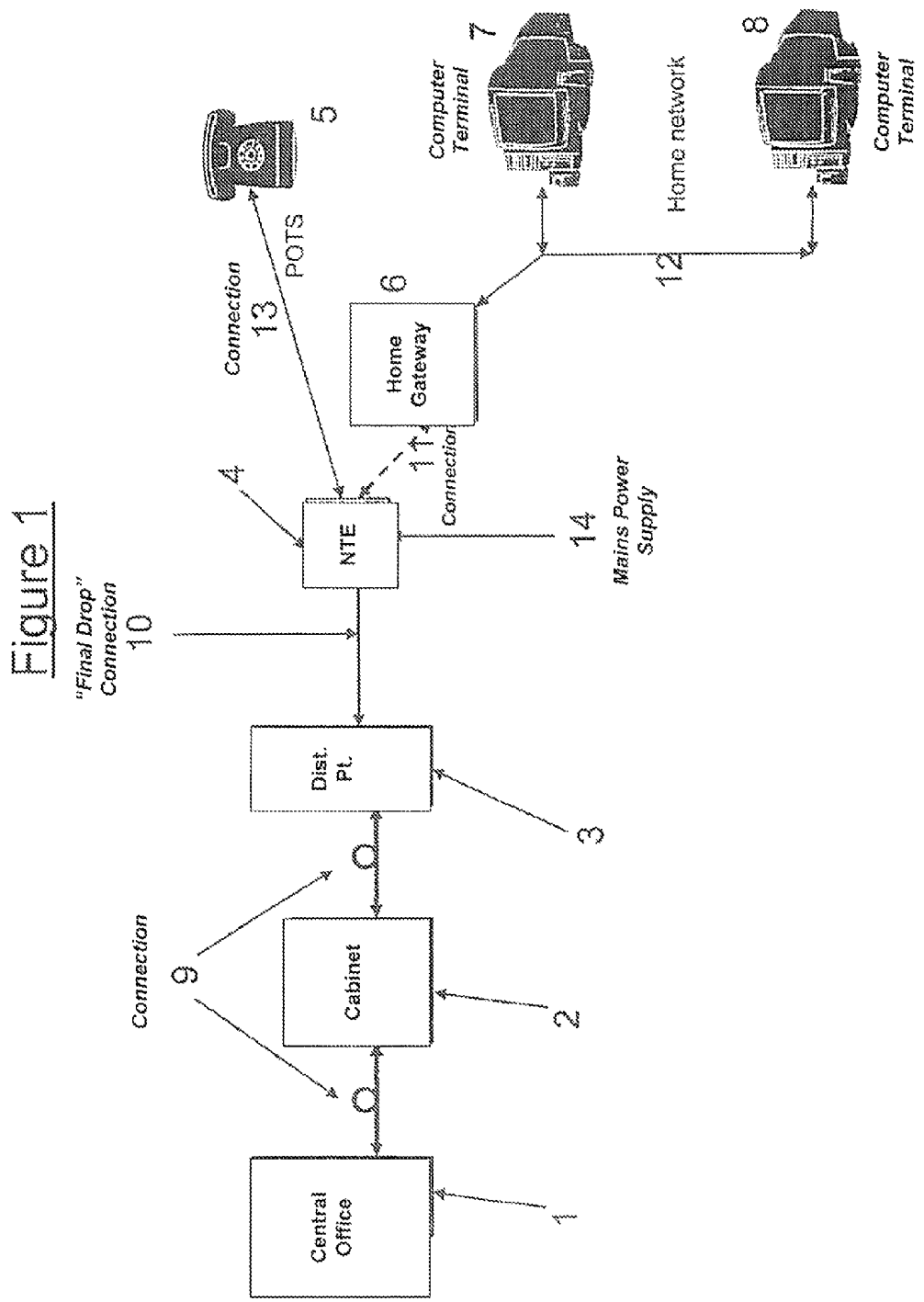
FIG. 1 illustrates a basic reverse power feed architecture as already discussed.

FIG. 3 depicts a network node 3 configured to interconnect an optical connection 9 and two or more wired local connections 10, 110. Network node 3 includes a photo/electric or optical/copper interface 31 for converting signals from the optical connection 9 to baseband for transmission over the copper connections 10, 110, and vice versa. There is also a multiplexer/demultiplexer 32 for distributing the signals to the two or more wired connections 10, 110, and for combining the signals received therefrom.

The optical/copper interface 31 and multiplexer/demultiplexer 32 require electrical power to operate, and this power is distributed to these components by a power distribution unit 36 in the network node 3. In this invention, the power is supplied to the power distribution unit 36 from the customer NTE 4, 104 through the wired connections 10, 110. The network node 3 is provided with a power management system 33 which generates signals to control the co-operating equipments 4, 104 to deliver the power required, in accordance with demand assessed by the power distribution unit 36.

The power control module 33 is programmed to generate power control signals in accordance with known properties of the various connections 10, 110, such as the geographical distance to the respective network terminations 4, 104. In the preferred embodiment a measuring unit 34 determines a physical property of the connections—this may be the electrical resistance of the wired connection, or the maximum bitrate it can support. These properties are detected by taking measurements from measurement points 35, 135 on the wired connections, and the results of such measurements are fed to the power control unit 33. The measurement of line characteristics is a well-developed art, and is used for instance to test line integrity, or to test a line's suitability for advanced services such as high bandwidth internet access.

The NTE 4 in the customer premises is configured as shown in FIG. 4. (Each customer premises has a similar network termination equipment, as also exemplified by the equipment 104 in FIG. 2). The device also includes a splitter 40 to separate broadband and POTS traffic carried over respective connections 11, 13. Power control signals transmitted from the power management system 33 in the distribution point 3 are intercepted at a detection point 41 and processed by a power management system 42, controlling a power distribution unit 46 which delivers electrical power from a mains feed 14 into the network connection 10. The power management system 42 may also co-operate with the measuring unit 34 in the distribution point 3 to determine the resistance, available bandwidth, or other properties of the connection 10.

As shown in FIGS. 3 and 4, the distribution point 3 and NTE 4 each have a respective battery power backup 37, 47 associated with their respective power distribution units 36, 46. Under normal conditions these are maintained fully charged by means of trickle currents from the mains power supply 14 to the NTE 4, and thus over the "final drop" connection 10 to the distribution point 3, under the control of the power management systems 33, 42. The battery backup 37 allows the distribution point 3 to remain usable when none of the co-operating users having a power feed are on line, or in the event of a power failure affecting all the co-operating users. This ensures that the distribution point 3 remains capable of establishing new connections, and that plain telephony service 5 is not lost in those circumstances. The battery backup may be fed either from the current drawn from the users currently on line, or as a trickle current from all users having a mains feed. The customer NTE 4 is also provided with a battery backup 47, to ensure that it remains usable in the event of a failure of the mains power supply 14.

In such a network, traditional voice telephony services can be provided via subscriber line interface circuits (SLIC)s in the fiber-fed remote node 3. Alternatively, VoIP (Voice over Internet Protocol) facilities can be used using the digital subscriber loop (DSL) link to the home gateway 6. Under power-outage conditions the DSL can revert to a low-power mode that has sufficient capacity to transport a 64 kbit/s POTS channel. However this method relies upon both the customer NTE 4 and home gateway 6 having an operational battery back-up system. Therefore it is preferred to use SLICs as the supply method for lifeline services.

Figure 2:
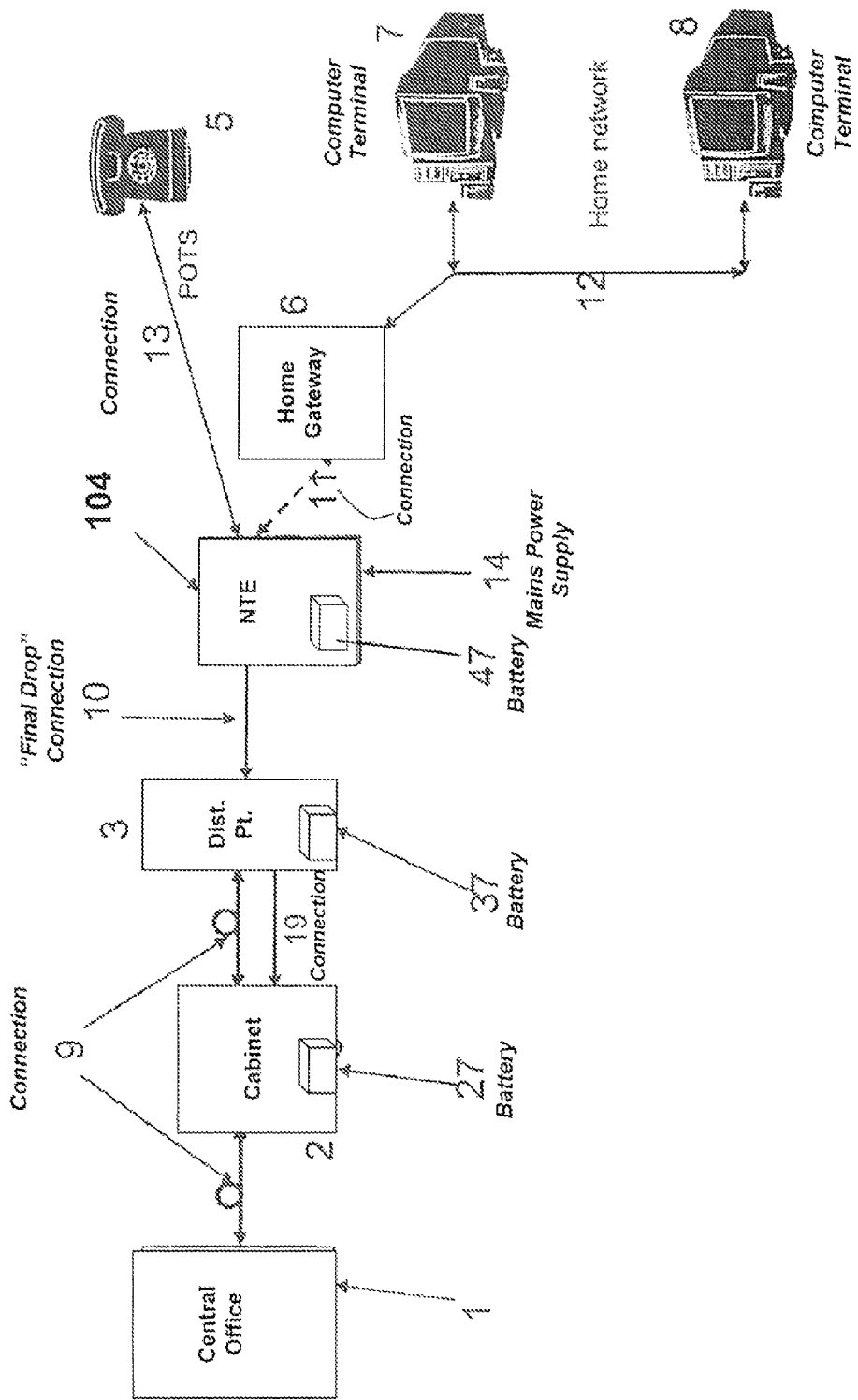
FIG. 2 illustrates a bi-directional power feed architecture according to an embodiment of the invention.

As shown in FIG. 2, low bandwidth copper connections 19 may be maintained between the network nodes 2, 3, in parallel with a fiber optic connection 9. These connections allow a basic telephone and/or narrowband internet service to be provided in the event of failure of one of the components in the optical system. Using this copper connection 19, a battery backup 27 can be maintained in nodes other than the distribution point 3, further towards the exchange, such as the cabinet 2. Because of the branched nature of the network, several customer NTEs 4 Can feed each distribution point 3, and all the customer equipments served by each of several distribution points 3 will serve a single cabinet 2, so the current drawn from each customer will be very small. These trickle currents are controlled by the respective power management system 33, 42, to prevent overcharging. The actual power drawn from each customer NTE 4 is controlled by the power control function 33, and is the subject of our co-pending International patent application WO 2009/138710 A1 entitled "Power Supply System," which was filed concurrently with the present application and claims priority from European patent Application 08251711.1, both the referred PCT and European applications are incorporated herein by reference.

Now, consider the situation during a power outage which has interrupted the power supply 14 to the customer premises, incidentally disabling the user's home network 12. It is desirable in such circumstances to retain a "lifeline" service between the exchange or central office 1 and the telephone handset 5 over the connections 9, 10, 13. This requires the nodes (2, 3, 4) in the network to continue to function, despite the loss of power from the mains power supply 14 which normally maintains them. By limiting the service to simple telephony, the battery power 27, 37, 47 can be sufficient to maintain the service for a reasonable duration. Moreover, the power management systems 33, 42 management systems can be used to transfer charge from one battery 27, 37 to another over the network according to the usage, or remaining life, of each battery 27, 37, 47.

If a fiber-fed remote node, such as a distribution point 3, also has some copper connection 19 to a cabinet 2, then it is possible to trickle-charge a battery 27 located at the cabinet 2 from excess charge that is obtained via reverse power feed from the NTEs 4 located at the customer premises. Under power outage conditions, the battery 27 located in the cabinet 2 can change to a forwards power-feed mode which can then charge the batteries 37 located within the fiber-fed remote nodes (3). The ultimate aim of bi-directional power feed is to provide sufficient electrical capacity at the fiber-fed remote node (3) to power the common ONU/multiplexer circuitry and the SLICS in order to provide a 64 kbit/s based lifeline POTS service—either indefinitely or for a pre-determined time defined by a service level agreement.

As shown in FIG. 2, the cabinet 2, distribution point 3 and customer NTE 4 each have a respective battery power backup 27, 37, 47 associated with their respective power management systems 33, 42. Under normal conditions these are maintained fully charged by means of trickle currents from the mains power feed 14 to the customer NTE 4, and thus over the "final drop" connection 10 to the distribution point 3. Using the copper connection 19 provided in parallel with the fiber connection 9, a battery backup 27 can also be maintained in nodes further towards the exchange, such as the cabinet 2. Because of the branched nature of the network, several customer NTEs 4 can feed each distribution point 3, and all the customer equipments served by each of several distribution points 3 will serve a single cabinet 2, so the current drawn from each one will be very small. These trickle currents are controlled by the respective power management systems 33, 42, to prevent overcharging.

Now, considering the situation during a power outage which has removed the power supply 14 from the customer premises, disabling the user's home network 12, the main priority is to ensure sufficient power capacity at the fiber-fed remote node to provide the "lifeline" plain telephone service between the exchange or central office 1 and the telephone handset 5 over the connections 9, 10, 13. This requires the nodes (2, 3, 4) in the network to continue to function, despite the loss of power from the mains power supply 14 in the NTE 4 which normally maintains them. If there is a power-outage at the NTE 4 then the remote nodes (2, 3) have to rely on their local battery backup.

By limiting the service to simple telephony, the battery power 27, 37, 47 can be sufficient to maintain the service for a reasonable duration. Moreover, the power management systems 33, 42 can be used to transfer charge from one battery 27, 37 to another over the network according to the usage, or remaining life, of each battery 27, 37, 47. Consequently, a bi-directional power feed can be used to provide sufficient electrical capacity at the fiber-fed remote node (3) to power the common ONU/multiplexer circuitry 31/32 and the subscriber line interface circuit (SLIC) in order to provide a 64 kbit/s based lifeline POTS service—either indefinitely or for a pre-determined time defined by a service level agreement.

It should be noted that customer equipment without provision for local power feeds may also be connected to the distribution point 3. The power control unit operates dynamically, to take account of different users coming on or off line, so that power is maintained when some users go off line. The amount of power, if any, delivered by each customer equipment may be recorded by the distribution point 3, and used to calculate an appropriate discount to each user's bill.

The invention claimed is:

1. A node configured for bi-directional electrical power feeding within a telecommunications network, comprising;
   a power management system arranged to allow the node to receive electrical power from one or more customer network terminations connected thereto by electrical communications media, and also to deliver electrical power to one or more customer network terminations; and
   a communications connection control system for controlling the operation of services to the one or more customer network terminations such that only communications requiring a low bandwidth are connected to the customer network terminations if power is not being delivered to the node from the customer connections, and that communications requiring high bandwidth are only connected to the customer network terminations if power is being delivered to the node from the customer connections.

2. A node in a telecommunications network according to claim 1, wherein the communications requiring a low bandwidth are provided to any network terminations that are not supplying power to the node.

3. A node in a telecommunications network according to claim 1, comprising an electrical storage device for powering the node and any connected network terminations drawing power therefrom when no external power supply is available, the power management system being arranged to charge the storage device by as trickle charge from any network terminations delivering power to the node.

4. A node in a telecommunications network according to claim 3, wherein the communications requiring a low bandwidth are provided to any network terminations that are not supplying power to the node, wherein the communications connectivity control system is controlled by the power management system to limit service according to the remaining charge stored in the electrical storage device.

5. A network of telecommunications nodes each according to claim 1, wherein each node further comprises a power management system, the network interconnected by an electrical communications network, and wherein the power management system of each of the network of telecommunications nodes is arranged to co-operate with the power management systems of the other telecommunication nodes to deliver electrical power over the electrical communications network from one or more nodes or customer terminations which have connection to an external power supply.

6. A method of supplying electrical power to elements of a telecommunications network comprising network nodes and customer termination points interconnected by electrical commnunications connections, wherein at least one of the network nodes is configured for bi-directional electrical power feeding, and wherein at least some of the customer termination points have an external power supply the method comprising;
   feeding electrical power over the electrical communications connections to nodes having no other power supply;
   controlling the operation or services to provide only communications requiring a low bandwidth to the customer network terminations if power is not being delivered to the node from the customer connections; and
   controlling the operation of services to connect communications requiring high bandwidth to the customer network terminations only if power is being delivered to the node from the customer connections.

7. A method according to claim 6, wherein at least some of the nodes comprise electrical storage devices for powering the node and any connected network terminations drawing power therefrom when no other power supply is available, the storage device being charged by trickle charges from one or more of the terminations when a power supply is available from said terminations.

8. A method according to claim 6, wherein electrical power is deliverable by the network from the nodes to one or more of the customer network terminations during interruptions to their external power supplies.

9. A method according to claim 6 wherein a first category of telecommunications service is provided to terminations supplying power to a node and a second, more limited category of communications service is provided to terminations drawing power from a node.

10. A method of supplying electrical power to elements of a telecommunications network comprising network nodes and customer termination points interconnected by electrical communications connections, wherein at least one of the network nodes is configured for bi-directional electrical power feeding, and wherein at least some of the customer termination points have an external power supply, the method comprising:
    feeding electrical power over the electrical communications connections to nodes having no other power supply, at least some of the nodes comprising electrical storage devices for powering the node and any connected customer termination points drawing power therefrom when no other power supply is available;
    charging the storage device by trickle charges from one or more of the customer termination points when a power supply is available from said customer termination points;
    delivering electrical power via the network from the nodes to one or more of the customer termination points during interruptions to their external power supplies;
    controlling the operation of services to provide only communications requiring a low bandwidth to the customer termination points if power is not being delivered to the node from the customer termination points; and
    controlling the operation of services to connect communications requiring high bandwidth to the customer termination points only if power is being delivered to the node from the customer termination points.

11. A method according to claim 10, wherein the communications requiring high bandwidth are provided to terminations supplying power to a node and the communications requiring a low bandwidth are provided to terminations drawing power from a node.

* * * * *